F. E. PENDLETON.
GAGE FOR STEAM TRAPS AND OTHER PURPOSES.
APPLICATION FILED MAY 31, 1912.
1,191,342. Patented July 18, 1916.
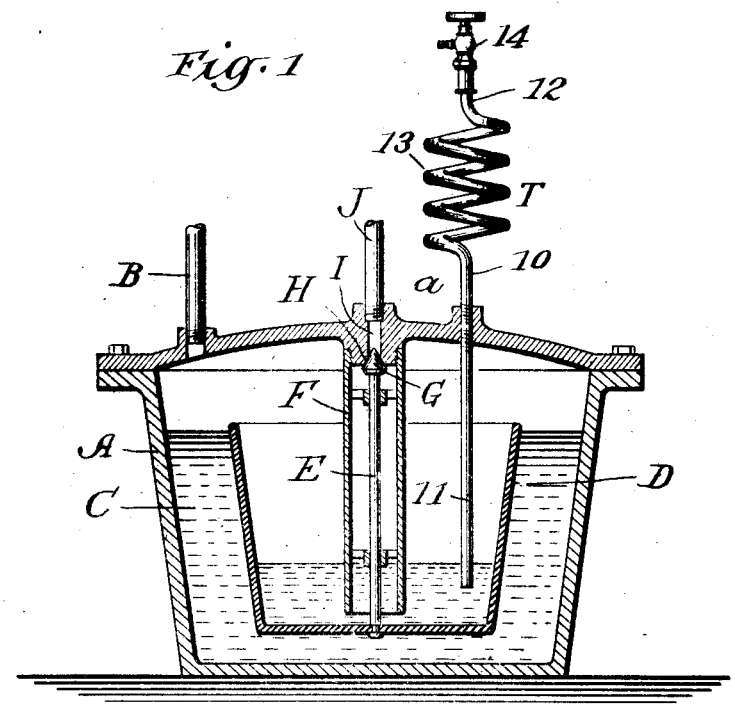
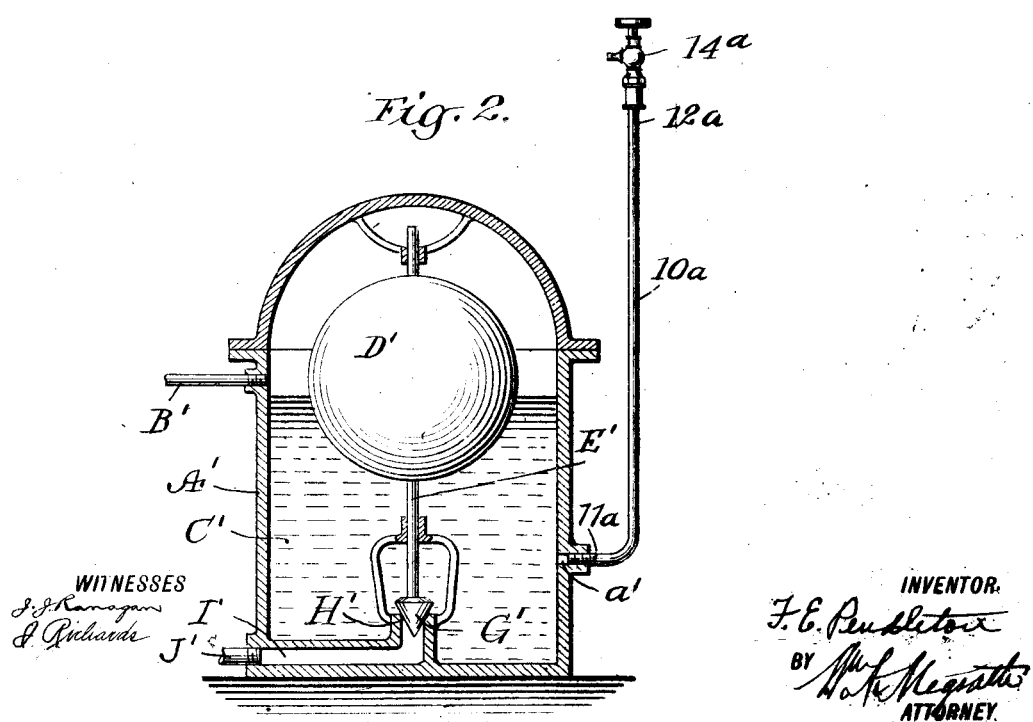

UNITED STATES PATENT OFFICE.

FRANK E. PENDLETON, OF MONTCLAIR, NEW JERSEY.

GAGE FOR STEAM-TRAPS AND OTHER PURPOSES.

1,191,342.  Specification of Letters Patent.  Patented July 18, 1916.

Application filed May 31, 1912. Serial No. 700,571.

*To all whom it may concern:*

Be it known that I, FRANK E. PENDLETON, a citizen of the United States, and a resident of Montclair, county of Essex, and State of New Jersey, have invented a new and useful Improved Gage for Steam-Traps and other Purposes, of which the following is a specification.

One of the objects of the invention is to provide a device for determining with certainty, safety, ease and quickness, the presence or absence of a normal amount of water within a steam trap which must be present in order that the steam trap may operate properly.

Other objects will appear from the hereinafter description.

Although this invention is primarily intended to be used on a steam trap for the purpose stated, yet it may also be used with any type of vessel or other receptacle wherein is contained a liquid and superimposed vapor, such as aqueous ammonia with superimposed aqueous vapors, and such vapors as have a temperature considerably above or below that of the surrounding atmosphere for the purpose of determining the presence or absence of such liquid at a certain point in the container. The following description of the invention, therefore, is not to be construed as limiting its application to the devices hereinbelow set forth.

The invention will first be described as applied to a steam trap.

A steam trap is ordinarily designed to provide means for automatically discharging water from a steam pipe or vessel containing a mixture of steam and some water, without allowing any of the steam to escape. This result is ordinarily obtained by providing within the trap a chamber wherein water may collect, and in the wall of such chamber an opening ordinarily closed by a valve, but which from time to time is opened to allow water to be discharged from the trap through said opening. This valve is operated in certain types of traps by what is known as a bucket float, and in others by some form of air tight float which rises and falls with the change of the level of the water within the trap, or by the expansion and contraction of a metal part of the trap with changes in the temperature of said part. In all these traps a condition necessary to their proper operation is that a certain amount of water shall always be retained and remain in the chamber within the trap. This body of water provides at all times what is ordinarily termed a water seal and may vary in depth from a few to several inches, the depth of the seal being the distance from the normal surface of the water in the trap to the level of the opening under the surface of the water through which the water is discharged from the trap.

The first mentioned style of trap permits the water to accumulate within the trap until the buoyancy of the float has been overbalanced, causing the float to sink, thereby opening the valve and discharging from the trap a quantity of water equal in amount to all accumulations received by the trap since the previous operation of the valve. In the second style the float immediately operates when the accumulated water is above the seal to open the valve, thereby maintaining within the trap at all times the same amount of water. In either case, a certain amount of water, that is, the water seal, is retained within the trap. However, if, due to any defect of construction or wear or disarrangement of the parts, or due to the presence of foreign particles of scale in the water the valve leaks or does not properly seat, the water escapes, the water seal is destroyed and the steam within the trap and within the pipe or vessel to which the pipe is connected, will escape from the opening in the trap, causing undue loss of steam.

The presence of the water seal indicates no loss of steam through the trap and the absence of the same indicates the loss of steam through the valve.

The usual means heretofore employed in certain types of traps to indicate the presence of a water seal is to connect to the casing of the trap two valves of proper construction, one below the water seal and the other above the same, and to connect said valves by a glass tube in such manner that when both valves are open, water will flow into the tube to the level of the water in the trap. That construction is objectionable as the glass tube is liable to become dirty, obscuring the level of the water in the glass, and furthermore, the glass is liable to breakage which may allow the escape of water and steam and thereby cause damage. In certain other types of traps it is not possible to use even the gage glass described.

The invention is shown in the accompanying drawing, in which:

Figure 1 is a longitudinal section of the same applied to a trap, the valve of which is operated by a bucket float. Fig. 2 is a modified form of the invention applied to the trap, having an air tight float for operating the valve.

Referring to Fig. 1, A represents a trap having an inlet pipe B leading thereto. C represents the water in the trap; D the bucket float having a valve stem or rod E connected thereto which projects into the short pipe F. G is the valve operated by said bucket, which is seated at H to close the opening I, to which the outlet pipe J is connected. The improved gage applied to this type of trap is marked T and consists of a tube 10, preferably of brass, open at one end 11, and closed at the other end 12, and provided intermediate its ends with a helix 13. The closed end of the tube may be supplied with a removable cap or other device, or permanently closed by a seal or cap, but preferably by a valve 14, which normally closes said end of the valve but which may be opened. The diameter and the length of the tube may be varied according to conditions, but the diameter is preferably small in comparison to the length of the tube and the wall of the tube is preferably thin. When applied to the type of trap shown in Fig. 1, the upper end or top of the trap is provided with an opening a, through which the open end of the tube projects and extends into the bucket below the normal level of the water contained therein, but above the lower end of the pipe F.

In Fig. 2 I have shown a trap A', having an inlet pipe B', above the normal level of the water C', contained in the trap. In said trap is the air tight float D', having the valve stem E', carrying the valve G', which is seated on the seat H', to which the outlet channel I' is connected, the outlet pipe J' being connected to said channel. The open end 11ᵃ of the gage T', in this form, is connected to the opening a', in the wall of the trap below the normal level of the water contained therein, and the tube 10ᵃ is shown without a helix, although it is evident that a helix may be provided between the two ends of the tube. In fact, the tube may be straight or bent in any shape or form, but it is preferably bent in the form of a helix, as shown in Fig. 1, or it may be straight, as shown in Fig. 2. In either case the tube is preferably so formed and connected to the trap that it may freely drain back into the trap any of the liquid that collects in the tube.

The operation of the invention is as follows: When the normal amount of water is in the trap a portion of such water passes into the tube through the open end due to the pressure within the trap. If the upper or outer end of the tube 12 or 12ᵃ be closed by the valve 14 or 14ᵃ, the air within the tube is forced to the upper or outer end. In this case although the water within the trap and the open end of the tube may be at a high temperature, even equal to the temperature of the steam within the trap, yet when a tube is properly proportioned in its length as compared with its outside diameter, the radiation of heat from the outer surface of the tube will be more rapid than the conduction of heat through the walls of the tube, or through the water or air within the tube. The temperature of the tube at its upper or outer end, therefore, will be so much lower than the steam or water within the trap that the hand may be held upon such part of the tube, and the presence of the proper amount of water within the trap thus readily determined. If the trap does not contain the proper amount of water the open end of the tube within the trap is exposed to the steam and the water in the tube will drain into the trap and be replaced by steam, and as the radiation of heat from the tube continues and the steam therein condenses, the condensate will continue to drain back into the trap and be continuously replaced by steam so that the temperature of the tube throughout its length will become approximately the same as the temperature of the steam so that the hand may no longer be held on the tube and the absence of the proper amount of water within the trap is thus determined. The use of a valve at the outer end of the tube is desirable as the air may be readily discharged, if desired, and any scale or grit which might otherwise collect within the tube to choke it be removed. Furthermore, by opening the valve the discharge of water therethrough will be evidence that the trap contains the proper water seal.

The use primarily to which the invention set forth is intended to be put is to determine merely the presence or absence of a liquid in a vessel at a point at which the end of the tube is located within the vessel.

Having now described my invention, what I claim as new and desire to secure by Letters Patent is:

1. A steam trap consisting of a vessel containing steam an liquid, an inlet and an outlet therefor, a thermal indicator consisting of a tube of thin material and of a comparatively small diameter with relation to its length, said tube having an open end tapping the vessel at a point below the normal level of the liquid, the other end of the tube being at a substantial distance above the liquid as and for the purpose set forth.

2. A steam trap provided with a water seal, said trap having inlet and outlet ports respectively above and below the seal, a float valve controlling the outlet port, a thermal indicator consisting of a tube of thin material and of comparatively small diameter with relation to its length said tube having an open end connection to the trap between the upper and lower level of the water seal, the upper end of the tube extending substantially above the water seal as and for the purpose set forth.

3. A steam trap provided with a water seal, said trap having inlet and outlet ports respectively above and below the seal, a float valve controlling the outlet port, a thermal indicator consisting of a tube of thin material and of comparatively small diameter with relation to its length, said tube having an open end connection to the trap between the upper and lower level of the water seal, the upper end of the tube having a valve therein and extending substantially above the water seal as and for the purpose set forth.

4. A steam trap provided with a water seal having inlet and outlet ports respectively above and below the seal, a valve normally closing said outlet port, means for opening said valve upon an excess of liquid accumulating in the traps, a thermal indicator consisting of a connection to the trap to normally remove the water of condensation, means for filling the tube with steam should the water seal be broken, substantially as and for the purpose set forth.

5. A steam trap, a liquid seal therein, a thermal indicator connected to the trap, means for cooling the indicator when the seal is effective, and means for heating the indicator when the seal is broken.

6. A steam trap, a liquid seal therein, a thermal indicator consisting of a tube of thin material connected to the liquid seal at one end and the other end extending at a substantial distance above the seal, means to insure liquid entering the tube when the seal is effective, and means to insure the entry of steam in the tube when the liquid seal is broken.

In witness whereof I have hereunto set my hand at the borough of Manhattan, city and State of New York, this 28th day of May, 1912.

FRANK E. PENDLETON.

In presence of—
  Isabel R. Richards,
  Frank Eufemia.